(12) United States Patent
Niles

(10) Patent No.: US 10,009,716 B1
(45) Date of Patent: Jun. 26, 2018

(54) METHOD AND SYSTEM FOR ENHANCING A TRAVELER'S/CONSUMER EXPERIENCE USING CUSTOMIZED CONTENT FOR SMART DEVICES/INTERNET OF THINGS DEVICES BASED ON DATA MINING INFORMATION

(71) Applicant: James E. Niles, New York, NY (US)

(72) Inventor: James E. Niles, New York, NY (US)

( * ) Notice: Subject to any disclaimer, the term of this patent is extended or adjusted under 35 U.S.C. 154(b) by 322 days.

(21) Appl. No.: 15/013,466

(22) Filed: Feb. 2, 2016

Related U.S. Application Data

(60) Provisional application No. 62/114,326, filed on Feb. 10, 2015.

(51) Int. Cl.
| | | |
|---|---|---|
| *G06F 15/177* | (2006.01) | |
| *H04W 4/02* | (2018.01) | |
| *H04L 29/08* | (2006.01) | |

(52) U.S. Cl.
CPC ............. *H04W 4/02* (2013.01); *H04L 67/141* (2013.01)

(58) Field of Classification Search
CPC ............................... H04W 4/02; H04L 67/141
USPC .................................................. 709/217, 221
See application file for complete search history.

(56) References Cited

U.S. PATENT DOCUMENTS

| | | | |
|---|---|---|---|
| 7,339,493 B2 | 3/2008 | El Zabadani et al. | |
| 7,792,920 B2 | 9/2010 | Istvan et al. | |
| 8,078,163 B2 * | 12/2011 | Lemond | G06Q 30/04 |
| | | | 455/431 |
| 8,150,387 B2 | 4/2012 | Klein et al. | |
| 8,239,592 B2 * | 8/2012 | Leaming | G06K 19/07 |
| | | | 710/62 |
| 8,320,901 B2 | 11/2012 | Klein et al. | |
| 8,543,516 B2 | 9/2013 | Aravamudan et al. | |
| 8,897,897 B2 | 11/2014 | Demskie | |
| 2005/0071879 A1 | 3/2005 | Haldavnekar et al. | |
| 2006/0064720 A1 | 3/2006 | Istvan et al. | |
| 2006/0080408 A1 | 4/2006 | Istvan et al. | |
| 2006/0248557 A1 | 11/2006 | Stark et al. | |
| 2012/0086563 A1 | 4/2012 | Arling et al. | |
| 2012/0143980 A1 | 6/2012 | Johansson | |

(Continued)

FOREIGN PATENT DOCUMENTS

| | | |
|---|---|---|
| CN | 103841109 A | 6/2014 |
| DE | 20 2014 005 801 U1 | 11/2014 |

(Continued)

OTHER PUBLICATIONS

Wirtz, Hanno, et al.; "Opportunistic Interaction in the Challenged Internet of Things"; CHANTS '14, Sep. 7-11, 2014, Maui, HI, USA.

(Continued)

*Primary Examiner* — Anthony Mejia
*Assistant Examiner* — Marie Georges Henry

(57) ABSTRACT

A system including at least one smart device. The at least one smart device includes one or more programmable elements. The at least one smart device is configured to receive one or more customization instructions from a user device. The at least one smart device configures the one or more programmable elements in response to the customization instructions. Communicating between the user device and at least one smart device provides a seamless and integrated experience based on preferences or suggestions from user data analysis.

20 Claims, 10 Drawing Sheets

(56) References Cited

U.S. PATENT DOCUMENTS

2012/0242526 A1* 9/2012 Perez .................... G08C 17/02
 341/176
2013/0086618 A1 4/2013 Klein et al.

FOREIGN PATENT DOCUMENTS

KR 10-1365454 B1 2/2014
WO WO 2015/012434 A1 1/2015

OTHER PUBLICATIONS

Kortuem, Gerd, et al.; "Market-Based User Innovation in the Internet of Things"; School of Computing and Communications, Lancaster University, Lancaster, UK.
Zipcar App for the iPhone and iPod; http://www.zipcar.com/phone.
Unlock the car with your phone; https://www.getaround.com/mobile.
Car2go Launches Mobile Access App; http://www.autorentalnews.com/channel/rental-operations/news/story/2014/12/car2go-launches-mobile-access-app-to-car-sharing-members.aspx.

* cited by examiner

METHOD AND SYSTEM FOR ENHANCING A TRAVELER'S/CONSUMER EXPERIENCE USING CUSTOMIZED CONTENT FOR SMART DEVICES/INTERNET OF THINGS DEVICES BASED ON DATA MINING INFORMATION

CROSS-REFERENCE TO RELATED APPLICATION

This application claims benefit to U.S. Provisional Patent Appl. Ser. No. 62/114,326, filed Feb. 10, 2015, "METHOD AND SYSTEM FOR ENHANCING A TRAVELER'S/CONSUMER EXPERIENCE USING CUSTOMIZED CONTENT FOR SMART DEVICES/INTERNET OF THINGS DEVICES BASED ON DATA MINING INFORMATION," which is hereby incorporated by reference herein in its entirety.

TECHNICAL FIELD

The disclosed systems and methods relate generally to communication and interaction with travelers (sometimes referred to herein as "users" or singularly as "user"). More particularly, the disclosed system and method allow travelers to have content residing on a third-party device customized (personalized) based on user customization information which may be stored on a user personal smart device or elsewhere.

BACKGROUND

Consumers and travelers now expect a fully seamless user experience when traveling, which is a keystone of success for the travel/entertainment industry. In today's environment, more and more technological user devices, such as phones and tablets, are being used to help travelers cope with and manage information. Current smart devices do not provide a full user experience because of the different choices that may be presented, programming that may need to occur, and/or due to their presence in unfamiliar geographical areas.

Millions of people travel internationally each year to countries where languages other than their own are spoken, displayed, or written. Travelers are often unable to understand the information that is provided to them by foreign language signs or sources. As such, trying to find dining, entertainment, activities, music, movies, television, nightlife, map directions, or sightseeing information in an unfamiliar geographic location can be a safety concern for travelers. While the travel/entertainment industries have attempted to provide travelers a complete user experience, they have fallen short because of not knowing the travelers' preferences.

While certain aspects of conventional technologies have been discussed to facilitate the present disclosure, no technical aspects are disclaimed and it is contemplated that the claims may encompass one or more of the conventional technical aspect discussed herein.

BRIEF SUMMARY

In some embodiments, a process and method for automatically customizing a user's information content preference on one or more third-party devices encountered while traveling is disclosed. Information content displayed may be based on data mining information that may be stored offsite such as a cloud environment or locally on a user device.

In some embodiments, a fulfilling user experience is provided to a user by having a seamless integration of smart devices. When a connection between a consumer/end-user smart device and one or more third-party smart devices is made, one or more customization options are applied to the third-party devices to provide a fulfilling consumer/end-user experience. Seamless integration happens when a user device communicates with one or more third party devices to automatically set user preferences. Connectivity may be established automatically by proximity, location, and/or one or more additional parameters of the user device.

In some embodiments, one or more third-party smart devices are customized based on data mining information. Analyzing such data from different perspectives and summarizing it into useful information allows consumer/travelers to make a better-informed decision. In some embodiments, one or more operations associated with data mining techniques are used to collect user customization data. In various embodiments, predictive modeling, database segmentation, link analysis, and deviation detection are used. One or a combination of these data mining techniques may control the consumer/travelers preference information. In some embodiments, data is retrieved from and/or stored on a third party platform for analysis.

BRIEF DESCRIPTION OF THE DRAWINGS

The features and advantages of the systems and methods will be more fully disclosed in, or rendered obvious by the following detailed description of the preferred embodiments, which are to be considered together with the accompanying drawings wherein like numbers refer to like parts and further wherein.

DETAILED DESCRIPTION OF THE PREFERRED EMBODIMENTS

In various embodiments, the present disclosure generally provides systems and methods for customization of third-party smart devices based on user customization data. The user customization data may be stored on and/or provided by a user device, such as, for example, a smart phone, tablet, laptop, and/or other portable electronic device. The user device, which may be carried on and/or with a user, is used to determine content, which is used to customize traveler preferences/content of third-party smart devices. Customization may be based on stored data mining elements of the user. The proposed systems and methods herein provide improvements to the third-party devices themselves as well as improvements to the interactions between users, user devices, and third-party devices.

Figure 1:
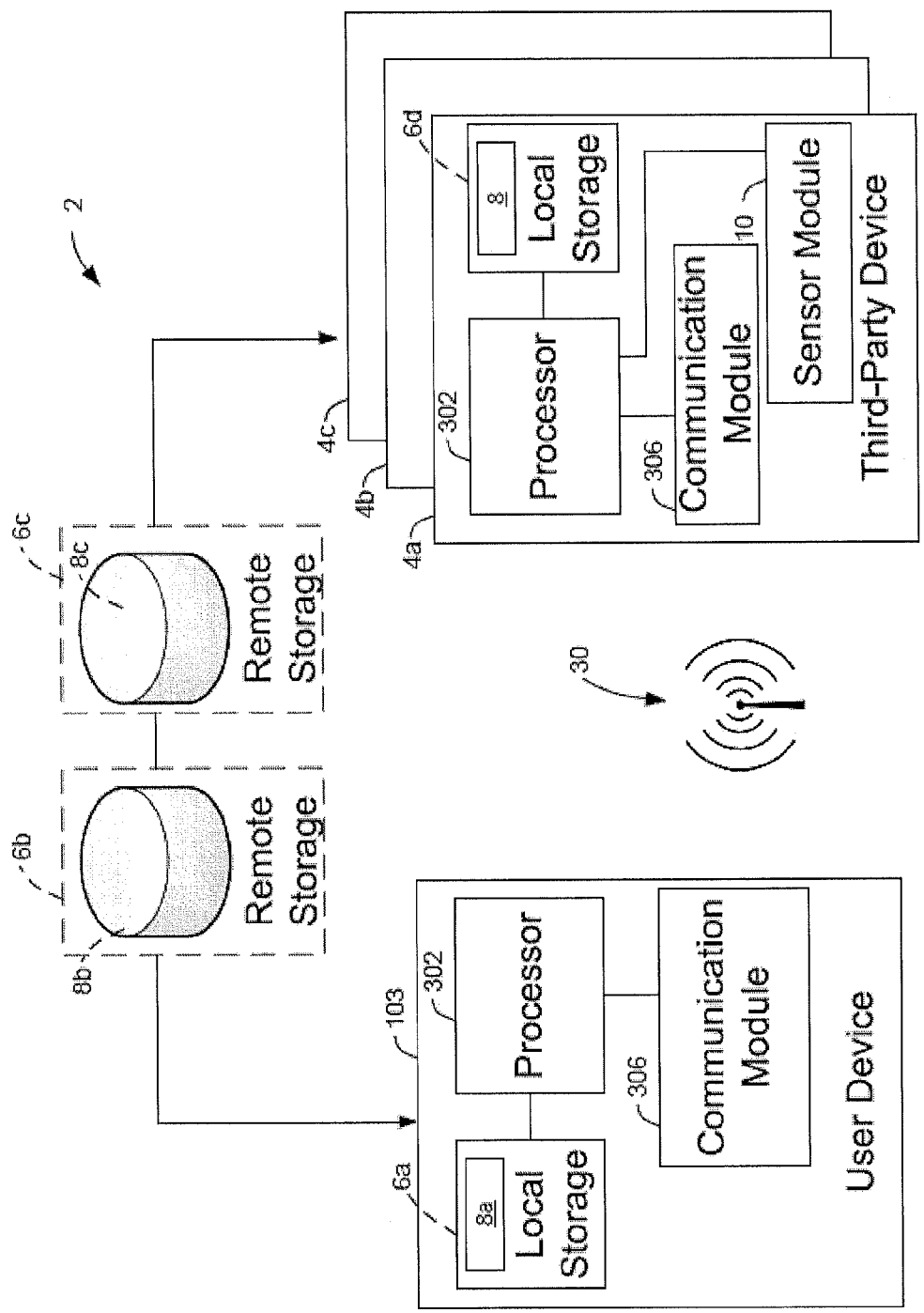
FIG. 1 illustrates one embodiment of a system for customizing one or more third-party smart devices based on customization information provided by a user device, in accordance with the present disclosure.

FIG. 1 illustrates one embodiment of a system 2 for providing customization of one or more third-party devices 4a-4c based on user customization information 8a, 8b, 8c (collectively "customization information 8" or "user customization information 8") stored in one or more storage devices 6a-6d (collectively "storage devices 6"). In some embodiments, transmission 30 of the previously stored user customization information 8 is initiated by a user device 3. Third-party devices 4a-4c can comprise any suitable device that is at least partially programmable and/or customizable. For example, third-party devices 4a-4c include, but are not limited to, smart devices and/or Internet of Things (IoT) devices. Each of the smart devices is an electronic device and/or a device containing an electronic circuit that can operate to some extent interactively and/or autonomously. Example smart device interactions include, but are not limited to, programming of user preferences, learning and/or mining of user preferences, generating suggestions, and/or generating custom content to list only a few non-limiting examples.

In some embodiments, when a user device 103 interacts with one or more third-party devices 4a-4c (collectively "third-party devices 4"), such as, for example, through proximity (e.g., via a wireless protocol, such as WiFi, Bluetooth, or NFC) and/or direct physical contact between user device 103 and third-party device(s) 4a, 4b, 4c (e.g., a wired connection), the user device 103 provides customization information 8 to the one or more third-party devices 4. The customization information 8 provides to the third-party device 4a-4c one or more user preferences and/or content preferences. For example, in some embodiments, customization information 8 can include settings for the third-party device 4a-4c to control operation and/or set one or more parameters thereof. The customization information 8 may be stored in a local storage 6a on the user device 103 and/or a local storage 6d of the third-party devices 4a-4c, or stored remotely on a remote storage 6b owned/controlled by the user (such as a cloud storage service) and/or remotely on a remote storage 6c owned/controlled by a third-party (collectively "storage device 6" or "data storage 6"). In some embodiments, customization information 8 is derived from data mining information and elements stored in local storage 6a, 6d and/or a remote storage 6b, 6c. By providing automatic programming and/or customization of third-party devices 4, the system 2 solves the problem inherent in providing third-party smart devices, i.e., the requirement that each user program/use the third-party smart devices before the devices are set to user preferences.

In various embodiments, third-party devices 4 include smart devices which are owned and/or operated by a party other than the user. For example, in some embodiments, third-party devices 4 include smart devices located within or around a hotel room, a rental property, a cruise ship cabin, an airline seat, a rental car, a rented device, and/or any other suitable location and/or device. Example third-party devices 4 can include, but are not limited to, refrigeration/mini-bars, microwaves, coffee makers, televisions, thermostats, smoke/carbon detections, radios, tablets, smartphones, computers, and/or any other suitable smart device. In some embodiments, a third-party device 4 can be a device that is owned by the user, such as, for example, a newly purchased smart device.

In some embodiments, customization information 8 is based on data mining information stored in one or more locations. For example, data mining information may be stored in a user-controlled remote storage 6b, such as in a cloud storage service, stored in a local storage 6a on a user device 3, such as within apps or other programs located on the user device 3, and/or remotely in third-part controlled storage 6c, such as consumer databases. Examples of data mining information that can be used to generate customization information 8 to customize travelers' preferences/content includes, but is not limited to, shopping data, dining data, entertainment data including information regarding movies, music, and/or other entertainment options, drink data, language data, activity data, event data, sightseeing data, nightlife data, television data, loyalty programs, location data environmental data such as temperature preferences, lighting preferences, coffee preferences, and/or alarm times, and/or any other suitable user preferences or content data. Data mined elements (history) can be merged together and/or analyzed to generate user customization information (either directly and/or indirectly).

Various data mining operations may be used to generate, gather, analyze, and/or otherwise interact with data mining and/or customization information. For example, in some embodiments, one or more data mining operations, such as predictive modeling, database segmentation, link analysis, deviation detection, and/or any other suitable data mining operation or technique are used to generate customization information 8 from data mining information. Data mining (also referred to as knowledge discovery database ("kdd")) is a process to explore data in search of consistent patterns and/or systematic relationship between variables, and then to validate the finding by applying the detected patterns to new subset of data.

In some embodiments, the main operations associated with data mining techniques (for example, predictive modeling, database segmentation, link analysis, and deviation detection) are further broken down into subset techniques such as association, classification, clustering, prediction, sequential pattering, and/or any other suitable subset technique. Subset techniques can be further broken down into one or more gradual techniques. One or a combination of data mining techniques are used to generate and/or control user customization information 8. In addition, data, such as customization data 8 or data mining information, may be retrieved and/or stored on a third-party platform for analysis.

In some embodiments, one or more categories of data mining information are used to generate customization information 8. For example, data mining information can include business mining, spatial data mining, sensor data mining, music data mining, knowledge grid mining, and/or any other suitable type of data mining. Data mining information, techniques, and/or categories may be stored in one or more locations, such as, for example, local storage 6a, 6d, user-controlled remote storage 6b, and/or a third-party controlled storage 6c. Customization information 8 can be generated from any combination of data mining information stored in one or more storage locations.

In some embodiments, one or more sensors 10 connected to a third-party device 4 initiate communication between a user device 103 and the third-party device 4. For example, in some embodiments, the one or more sensors 10 may comprise proximity sensors, signal-strength sensors, radio-frequency identification (RFID) sensors, Connectivity can be established through location, proximity, direct contact, and/or any other suitable process. In some embodiments, establishing connectivity between user device 103 and a third-party device 4 includes using a unique network identifier, such as an internet protocol (IP) address, of a user device 103 and/or third-party device 4. Connectivity can be established using one or more wired (e.g., USB, PS/2, IEEE 1394) and/or wireless (e.g., WiFi, Bluetooth, NFC) protocols.

In some embodiments, the system 2 is implemented in a temporary-use space accessed by a user. For example, in some embodiments, the system 2 includes third-party devices 4 located within a hotel room, a ship cabin, an airplane cabin, a rental vehicle, a rental property, and/or any other third-party temporary-use space, i.e., a space in which a user is present for at least a period of time.

Figure 2:
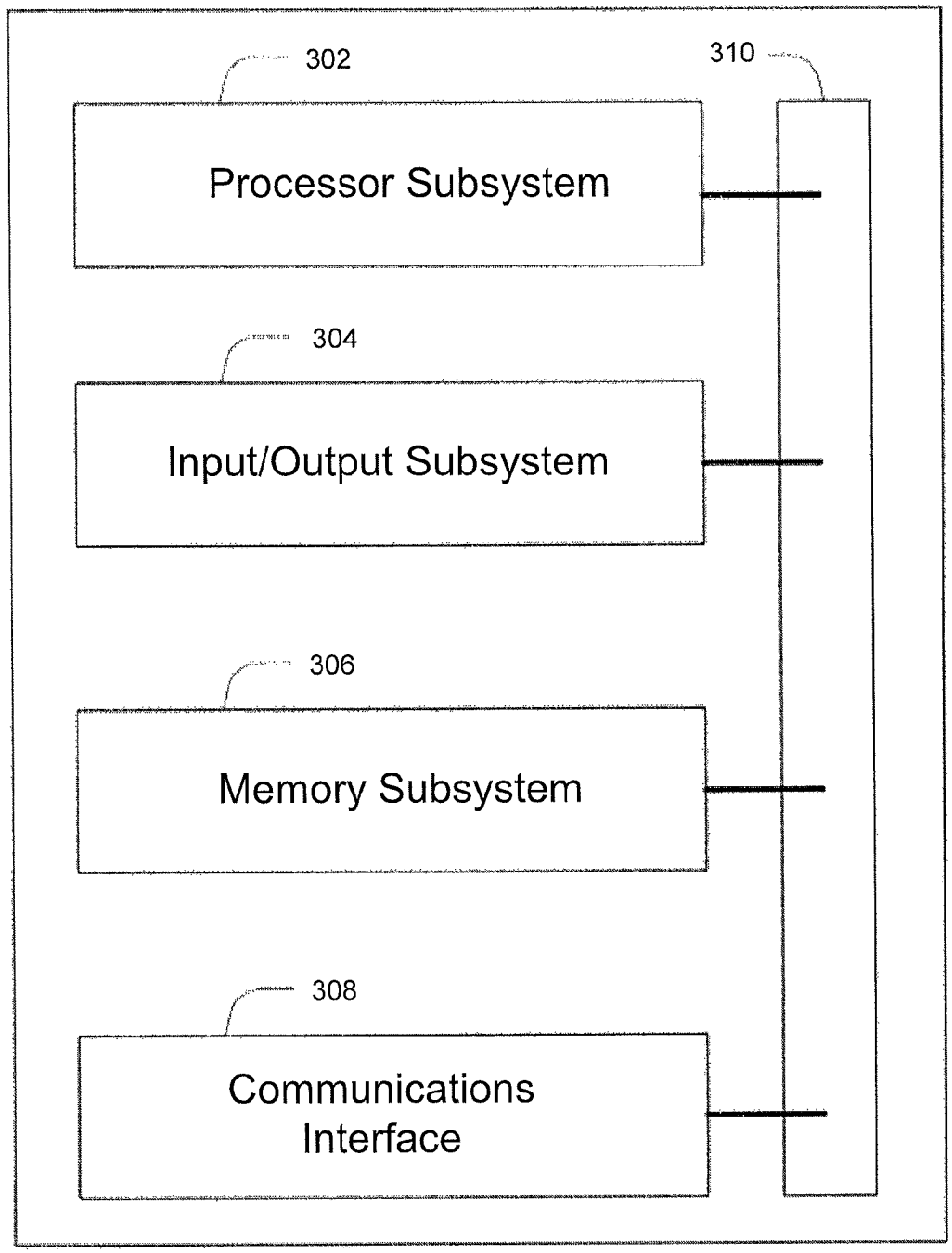
FIG. 2 shows a schematic view of an electronic device in accordance with some embodiments.

FIG. 2 is a schematic view of an illustrative electronic device 300 capable of implementing the system and method of customization third-party devices using a smart device. The electronic device 300 is a representative device that be a representative embodiment of the user device 3, 103, the one or more third-party devices 4a-4c, 104a-104g, and/or a portion of the user device and/or the third-party devices. The electronic device 300 may comprise a processor subsystem 302, an input/output subsystem 304, a memory subsystem 306, a communications interface 308, and a system bus 310. In some embodiments, one or more than one of the electronic device 300 components may be combined or omitted such as, for example, not including the communications interface 308. In some embodiments, the electronic device 300 may comprise other components not combined or comprised in those shown in FIG. 2. For example, the electronic device 300 also may comprise a power subsystem. In other embodiments, the electronic device 300 may comprise several instances of the components shown in FIG. 2. For example, the electronic device 300 may comprise multiple memory subsystems 306. For the sake of conciseness and clarity, and not limitation, one of each of the components is shown in FIG. 2.

The processor subsystem 302 may comprise any processing circuitry operative to control the operations and performance of the electronic device 300. In various aspects, the processor subsystem 302 may be implemented as a general purpose processor, a chip multiprocessor (CMP), a dedicated processor, an embedded processor, a digital signal processor (DSP), a network processor, a media processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 302 also may be implemented by a controller, a microcontroller, an application specific integrated circuit (ASIC), a field programmable gate array (FPGA), a programmable logic device (PLD), and so forth.

In various aspects, the processor subsystem 302 may be arranged to run an operating system (OS) and various applications. Examples of an OS comprise, for example, operating systems generally known under the trade name of Apple OS, Microsoft Windows OS, Android OS, and any other proprietary or open source OS. Examples of applications comprise, for example, a telephone application, a camera (e.g., digital camera, video camera) application, a browser application, a multimedia player application, a gaming application, a messaging application (e.g., email, short message, multimedia), a viewer application, and so forth.

In some embodiments, the electronic device 300 may comprise a system bus 310 that couples various system components including the processing subsystem 302, the input/output subsystem 304, and the memory subsystem 306. The system bus 310 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

Figure 3:
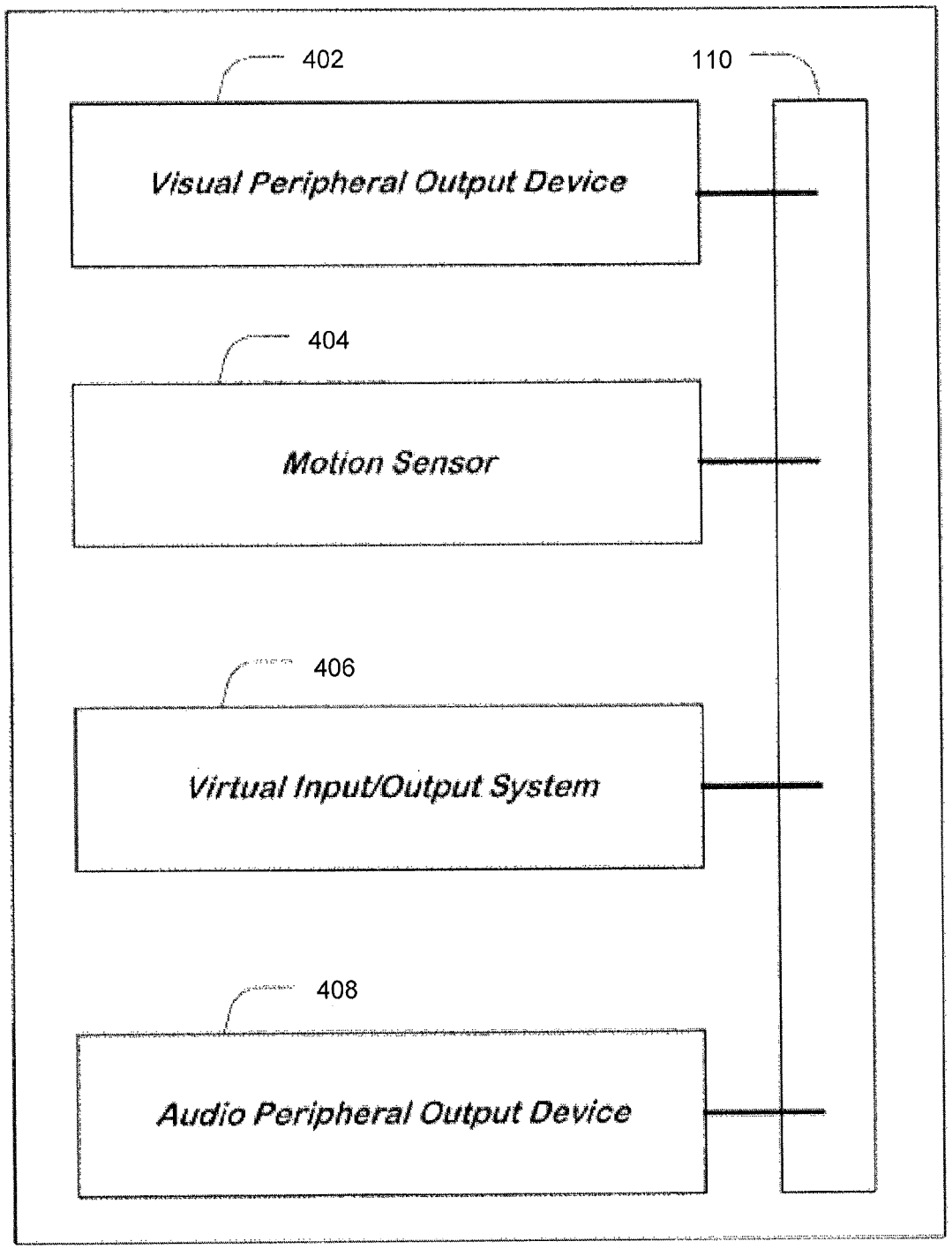
FIG. 3 shows one embodiment of an input/output subsystem for an electronic device.

FIG. 3 shows one embodiment of the input/output subsystem 304 of the electronic device 300 shown in FIG. 2. The input/output subsystem 304 may comprise any suitable mechanism or component to at least enable a user to provide input to the electronic device 300 and the electronic device 300 to provide output to the user. For example, the input/output subsystem 304 may comprise any suitable input mechanism, including but not limited to, a button, keypad, keyboard, click wheel, touch screen, or motion sensor. In some embodiments, the input/output subsystem 304 may comprise a capacitive sensing mechanism, or a multi-touch capacitive sensing mechanism.

In some embodiments, the input/output subsystem 304 may comprise specialized output circuitry associated with output devices such as, for example, an audio peripheral output device 408. The audio peripheral output device 408 may comprise an audio output including one or more speakers integrated into the electronic device. The speakers may be, for example, mono or stereo speakers. The audio peripheral output device 408 also may comprise an audio component remotely coupled to audio peripheral output device 408 such as, for example, a headset, headphones, and/or ear buds which may be coupled to the audio peripheral output device 408 through the communications subsystem 308. Alternatively, speakers may be external and non-integrated into the electronic device and connected to the audio peripheral output device by wireless communication.

In some embodiments, the input/output subsystem 304 may comprise a visual peripheral output device 402 for providing a display visible to the user. For example, but is not limited, the visual peripheral output device 402 may comprise a screen such as, for example, a Liquid Crystal Display (LCD) screen, incorporated into the electronic device 300. As another example, the visual peripheral output device 402 may comprise a movable display or projecting system for providing a display of content on a surface remote from the electronic device 300. In some embodiments, the visual peripheral output device 402 can comprise a coder/decoder, also known as a Codec, to convert digital media data into analog signals. For example, the visual peripheral output device 402 may comprise video Codecs, audio Codecs, or any other suitable type of Codec.

The visual peripheral output device 402 also may comprise display drivers, circuitry for driving display drivers, or both. The visual peripheral output device 402 may be operative to display content under the direction of the processor subsystem 302. For example, the visual peripheral output device 402 may be able to play media playback information, application screens for application implemented on the electronic device 300, information regarding ongoing communications operations, information regarding incoming communications requests, or device operation screens, to name only a few.

In some embodiments, the input/output subsystem 304 may comprise a motion sensor 404. The motion sensor 404 may comprise any suitable motion sensor operative to detect movements of electronic device 300. For example, the motion sensor 404 may be operative to detect acceleration or deceleration of the electronic device 300 as manipulated by a user. In some embodiments, the motion sensor 404 may comprise one or more three-axis acceleration motion sensors (e.g., an accelerometer) operative to detect linear acceleration in three directions (i.e., the x or left/right direction, the y or up/down direction, and the z or forward/backward direction). As another example, the motion sensor 404 may comprise one or more two-axis acceleration motion sensors which may be operative to detect linear acceleration only along each of x or left/right and y or up/down directions (or any other pair of directions). In some embodiments, the motion sensor 404 may comprise an electrostatic capacitance (capacitance-coupling) accelerometer that is based on silicon micro-machined MEMS (Micro Electro Mechanical Systems) technology, a piezoelectric type accelerometer, a piezoresistance type accelerometer, or any other suitable accelerometer.

In some embodiments, the motion sensor 404 may be operative to directly detect rotation, rotational movement, angular displacement, tilt, position, orientation, motion along a non-linear (e.g., arcuate) path, or any other non-linear motions. For example, when the motion sensor 404 is a linear motion sensor, additional processing may be used to indirectly detect some or all of the non-linear motions. For example, by comparing the linear output of the motion sensor 404 with a gravity vector (i.e., a static acceleration), the motion sensor 404 may be operative to calculate the tilt of the electronic device 300 with respect to the y-axis. In some embodiments, the motion sensor 404 may instead or in addition comprise one or more gyro-motion sensors or gyroscopes for detecting rotational movement. For example, the motion sensor 404 may comprise a rotating or vibrating element.

In some embodiments, the motion sensor 404 may comprise one or more controllers (not shown) coupled to the accelerometers or gyroscopes. The controllers may be used to calculate a moving vector of the electronic device 100. The moving vector may be determined according to one or more predetermined formulas based on the movement data (e.g., x, y, and z axis moving information) provided by the accelerometers or gyroscopes.

In some embodiments, the input/output subsystem 304 may comprise a virtual input/output system 406. The virtual input/output system 406 is capable of providing input/output options by combining one or more input/output components to create a virtual input type. For example, the virtual input/output system 406 may enable a user to input information through an on-screen keyboard which utilizes the touch screen and mimics the operation of a physical keyboard or using the motion sensor 404 to control a pointer on the screen instead of utilizing the touch screen. As another example, the virtual input/output system 406 may enable alternative methods of input and output to enable use of the device by persons having various disabilities. For example, the virtual input/output system 406 may convert on-screen text to spoken words to enable reading-impaired persons to operate the device.

Figure 4:
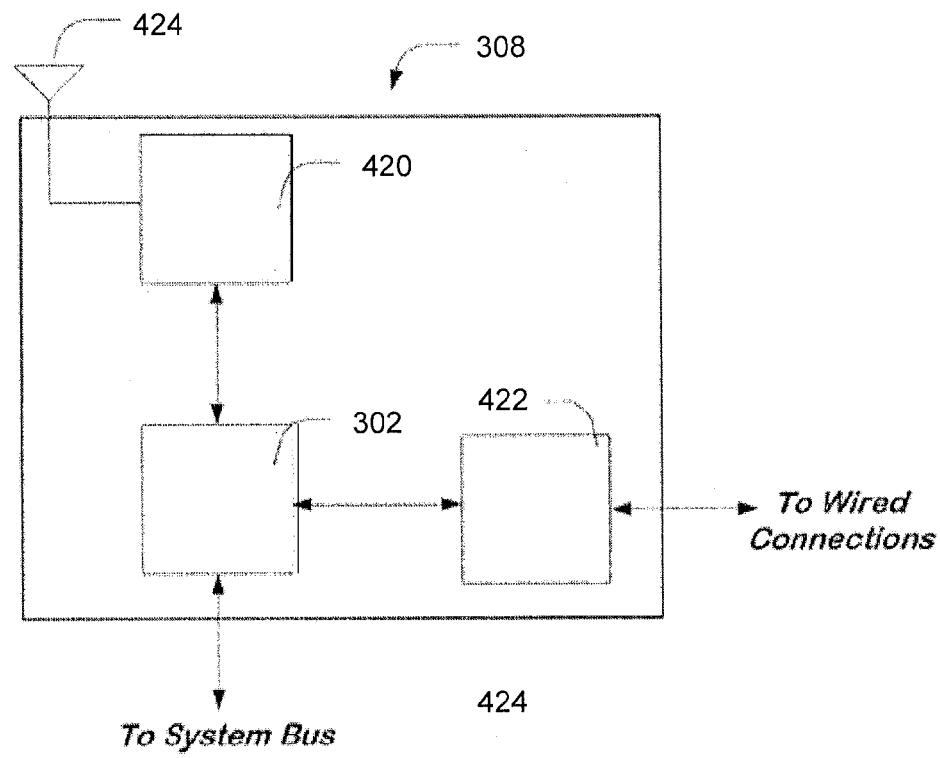
FIG. 4 shows one embodiment of a communications interface for an electronic device.

FIG. 4 shows one embodiment of the communication interface 308. The communications interface 308 may comprises any suitable hardware, software, or combination of hardware and software that is capable of coupling the electronic device 300 to one or more networks and/or additional devices (such as, for example, a user device 103 or one or more third-party devices 4a-4c.) The communications interface 308 may be arranged to operate with any suitable technique for controlling information signals using a desired set of communications protocols, services or operating procedures. The communications interface 308 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, smart devices such as those discussed herein, and/or any other suitable smart device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI)

communication, or Peripheral Component Interconnect (PCI) communication, to name only a few examples.

Accordingly, in various aspects, the communications interface 308 may comprise one or more interfaces such as, for example, a wireless communications interface 420, a wired communications interface 422, a network interface, a transmit interface, a receive interface, a media interface, a system interface, a component interface, a switching interface, a chip interface, a controller, and so forth. When implemented by a wireless device or within wireless system, for example, the communications interface 308 may comprise a wireless interface 420 comprising one or more antennas 424, transmitters, receivers, transceivers, amplifiers, filters, control logic, and so forth.

In various aspects, the communications interface 308 may provide voice and/or data communications functionality in accordance with different types of cellular radiotelephone systems. In various implementations, the described aspects may communicate over wireless shared media in accordance with a number of wireless protocols. Examples of wireless protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In various implementations, the described aspects may comprise part of a cellular communication system. Examples of cellular communication systems may comprise CDMA cellular radiotelephone communication systems, GSM cellular radiotelephone systems, North American Digital Cellular (NADC) cellular radiotelephone systems, Time Division Multiple Access (TDMA) cellular radiotelephone systems, Extended-TDMA (E-TDMA) cellular radiotelephone systems, Narrowband Advanced Mobile Phone Service (NAMPS) cellular radiotelephone systems, third generation (3G) wireless standards systems such as WCDMA, CDMA-2000, UMTS cellular radiotelephone systems compliant with the Third-Generation Partnership Project (3GPP), fourth generation (4G) wireless standards, and so forth.

Figure 5:
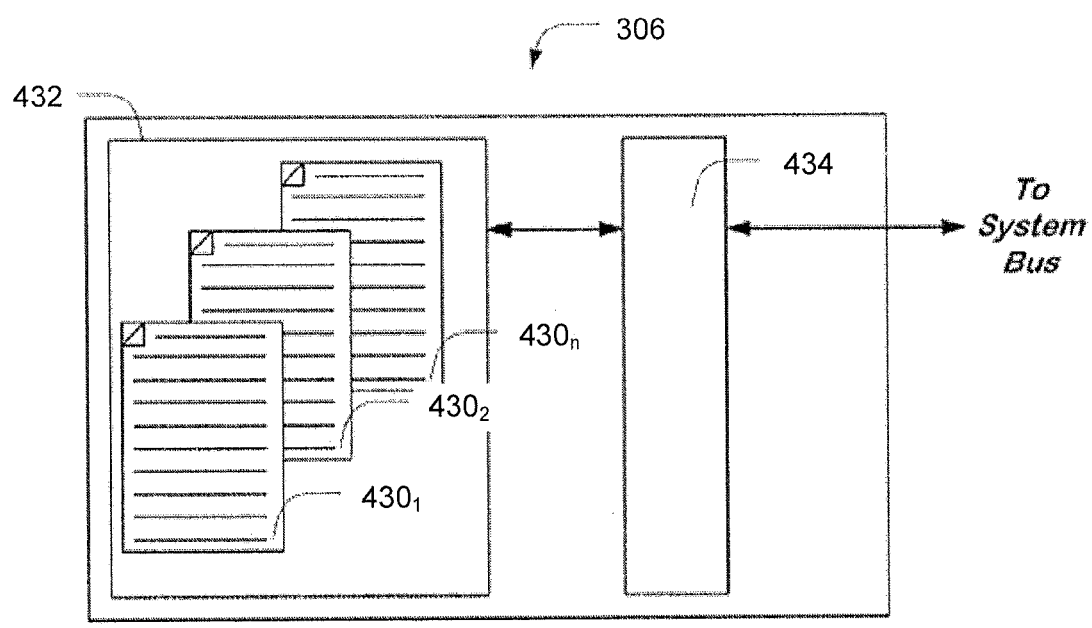
FIG. 5 shows one embodiment of a memory subsystem for an electronic device.

FIG. 5 shows one embodiment of the memory subsystem 306. The memory subsystem 306 may comprise any machine-readable or computer-readable media capable of storing data, including both volatile/non-volatile memory and removable/non-removable memory. The memory subsystem 306 may comprise at least one non-volatile memory unit 430. The non-volatile memory unit 430 is capable of storing one or more software programs $432_1$-$432_n$. The software programs $432_1$-$432_n$ may contain, for example, applications, user data, device data, and/or configuration data, or combinations therefore, to name only a few. The software programs $432_1$-$432_n$ may contain instructions executable by the various components of the electronic device 300.

In various aspects, the memory subsystem 306 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In some embodiments, the memory subsystem 306 may contain a software program for transmitting and/or receiving customization information and/or data mining elements. In one embodiment, the memory subsystem 306 may contain an instruction set, in the form of a file $432n$ for executing a method of customization on the electronic smart device 100. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processing subsystem 302.

Figure 6A:
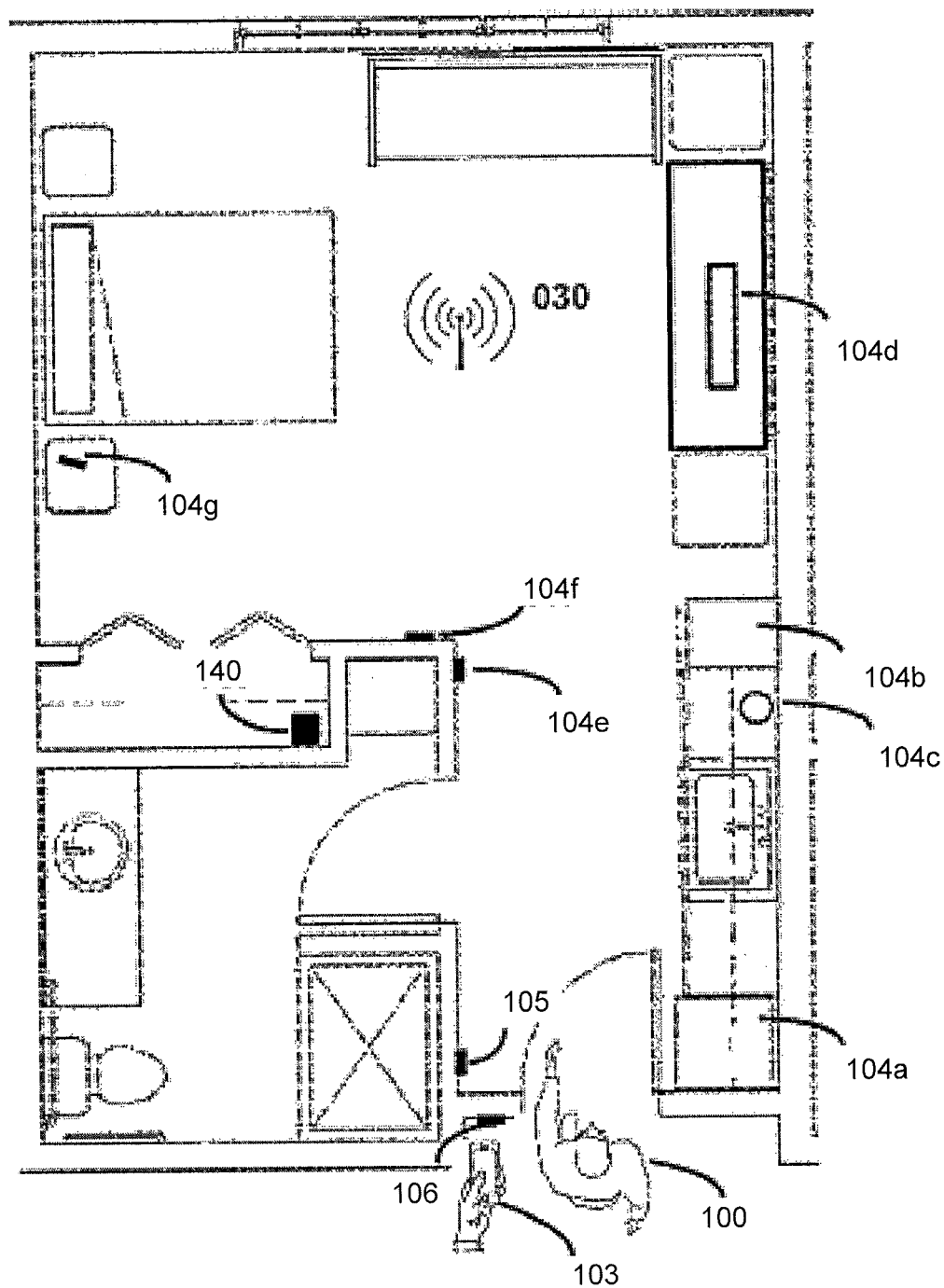
FIG. 6A illustrates one embodiment of a diagrammatic perspective view of a user entrance to a room including one or more third-party smart devices each having preferences/content that is customizable, in accordance with the present disclosure.

FIG. 6A illustrates one embodiment of a diagrammatic perspective view of a user 100 entering a room 150 in which one or more third-party smart devices 104a-104g (collectively "third-party devices 104") are located. For example, the room 150 may include third-party devices such as refrigeration/mini-bar 104a, microwave 104b, coffee maker 104c, television 104d, thermostat 104e, smoke/carbon detection 104f, and/or radio 104g. The third-party devices 104 may have a presence in the room 150 and be owned by someone other than the user who encounters the third-party devices 104 while there. For example, in some embodiments, the third-party devices 104 are owned by the owner of the room 150. In other embodiments, one or more of the third-party devices 104 are owned by a separate third-party. In some embodiments, access to the room may require interaction between a user device 103 and a room lock 106. For example, in some embodiments, access to a room may be provided by proximity and/or direct contact between a user device 103 and a room lock 106. In other embodiments, access to the room 150 is by conventional means, such as a key or access card. In some embodiments, a sensor 105 located within the room and is configured to recognize that a user has entered. The sensor 105 can detect the user automatically and/or be activated in response to user interaction, such as proximity between the user device 103 and the sensor 105. Once a user device 103 is connected to the room, for example, through a room lock 104h and/or a sensor 105, one or more third-party devices 104 located within the room 150 are programmed with the transmitted customization information 30 for the user 100.

In some embodiments, each of the plurality of third-party devices 104 includes preferences/content that is customizable. Examples of customizing traveler preference/content include adjusting room temperature based on home thermostat use data, for example, by accessing home thermostat data stored on a user device 103 and/or remote storage that can be used to automatically set the temperature in the room and/or setting the language on one or more of the third-party devices 104 to the native language of the user 100. As another example, a user may be provided with restaurant suggestions based on a food preference identified in the data mining information and/or customization information 8. The restaurant suggestion can be in the form of an advertisement or infographic displayed on a television 104d in the room 150. Additional examples of customization include providing directions to a user based on activity/event preferences, setting television channels, movies, music stations (or types of music) and/or infotainment menus based on stored data mining elements, and/or automatically configuring a coffee maker to start making coffee at a certain time or of a certain type based on stored data mining elements. Although various examples have been identified herein, it will be appreciated that any type of customization may be performed for any suitable smart device located within the room 150.

In some embodiments, if the user 100 makes a selection or sets a device setting that isn't already stored as an element (history) or a customization option, the new data elements may be stored within the mined data/customization information for future reference in a data storage 6. When a user 100 leaves the room 150, preference/content may change back to default content in response to sensor 105 detecting the user exiting room 150. In some embodiments, customization may be maintained for a predetermined time period, such as a time period corresponding to the length of a user's 100 stay in the room 150.

In some embodiments, smart devices 104 and/or sensors 105 located within the room 150 can be controlled by a networked monitoring/control hub 140 that may be located in the room 150 and/or remotely from the room 150. In some embodiments, a hub 140 is configured to start connectivity between user device 103 and third-party devices 104 and to compare default content for each of the third-party devices 104 to user device customization data 8 to set travelers' preferences/content for the third-party smart devices 104. In some embodiments, the hub 140 may utilize a combination of default content, the user's customization content 8 and/or suggestions of content based on the user's history elements to configure one or more third-party devices 104.

Figure 6B:
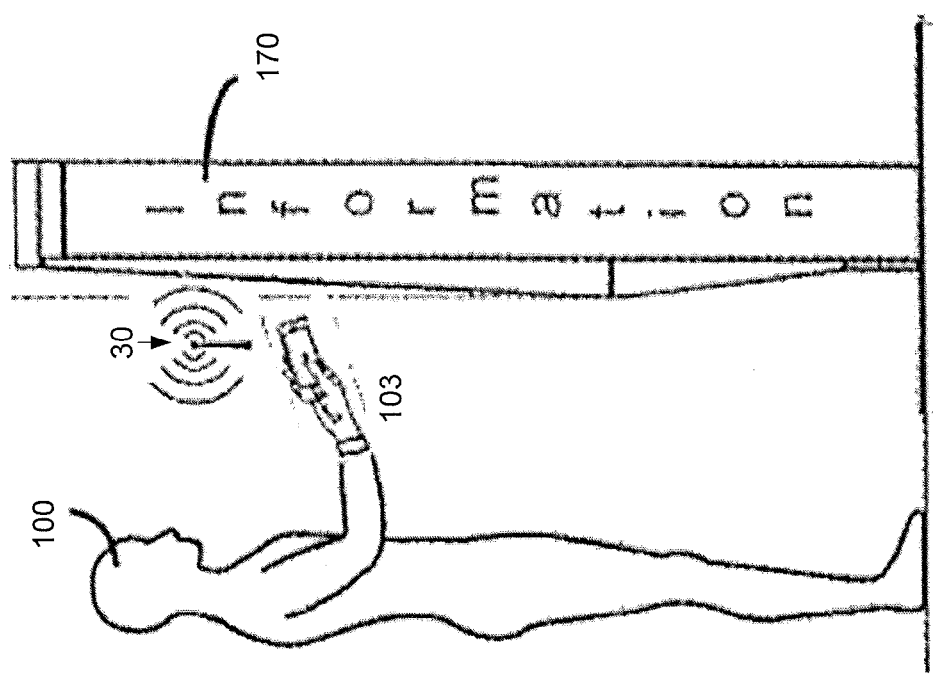
FIG. 6B illustrates one embodiment of a user interaction with a third-party smart kiosk having preferences/content that are customizable, in accordance with the present disclosure.

FIG. 6B illustrates one embodiment of a customizable kiosk/digital signage system 170. FIG. 6B illustrates a user 100 approaching a kiosk device 170 with a user device 103. The kiosk system 170 may be connected to an existing network to access up-to-date information such as sightseeing, restaurants, exhibits, and/or shopping information to display to a user 100. The user 100 places a user device 103 in proximity to the kiosk device 170 (for example, placing the user device 103 near the kiosk device 170, tapping the kiosk device 170, and/or being in a geo-referenced/gated location) to establish communication 30 between the user device 103 and the kiosk device 170. The information kiosk device/digital signage 170 displays information that is current and may make suggestions based on travelers' stored data mining elements and/or customization information. The kiosk device 170 may be located indoors and/or outdoors.

Examples of customizing the kiosk device 170 information preferences/content include showing advertisements and/or information for a restaurant, coffee shop, or other retailer based on stored data mining elements and/or suggestion generated by data analysis, providing directions to activities/events that a user enjoys, displaying sightseeing options based on data mining information, and/or providing other contextually appropriate customized information. When the user 100 leaves the kiosk system 170, preferences/content can revert back to default content and made available for subsequent users.

Figure 7A:
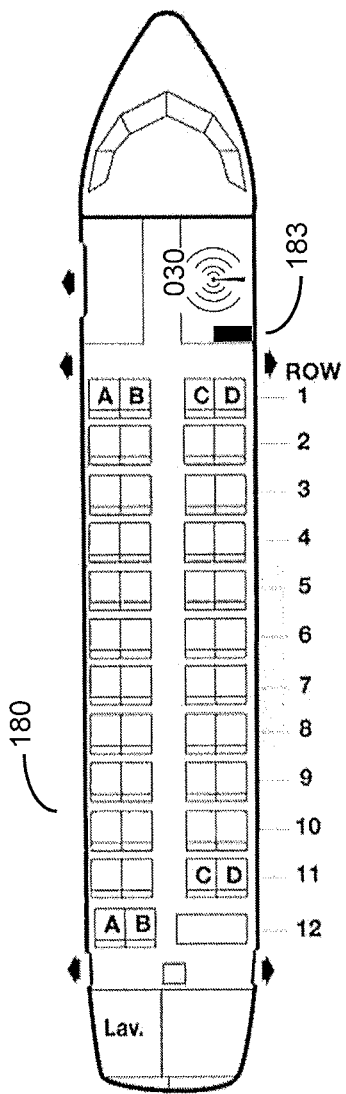
FIG. 7A illustrates one embodiment of a seating chart for an aircraft including an in-flight entertainment system that is customizable, in accordance with the present disclosure.
Figure 7B:
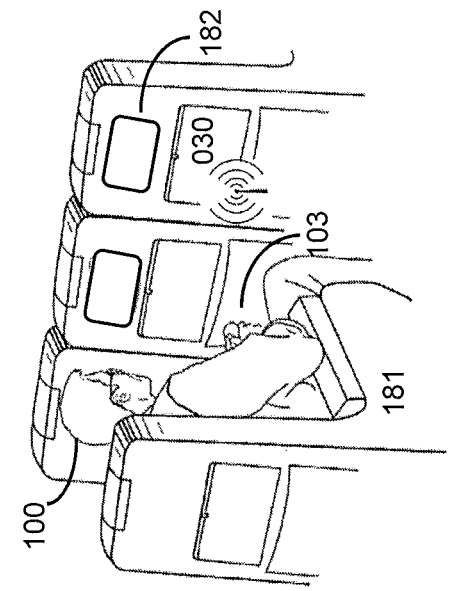
FIG. 7B illustrates one embodiment of a user interaction with the inflight entertainment system illustrated in FIG. 7A, in accordance with the present disclosure.

FIGS. 7A and 7B illustrate one embodiment of an aircraft 180 including an in-flight entertainment system 182 that is customizable, in accordance with the present disclosure. In some embodiments, the aircraft 180 includes an airline seat infotainment system/inflight entertainment (IFE) systems 182. As shown in FIG. 7B, a user 100 is located in a seat 181. Infotainment system 182 can be connected to an existing network to access up-to-date information such as sightseeing, restaurants, exhibits, and/or shopping information to display to the user 100. In some embodiments, the existing network is a network on the aircraft 180 maintained by the airlines. In some embodiments, the existing network extends to outside networks, such as, for example, the internet. The up-to-date information may be updated during idle periods of the aircraft 180 (for example, during idle periods on the ground) and/or in real-time during operation of the aircraft 180. The user 100 places a user device 103 in proximity of the infotainment system 182 (for example, within a predetermined distance of a display, in physical contact with the infotainment system 182, and/or a geo-referenced location with respect to the infotainment system 182) to establish communication 30 between the devices. In some embodiments, the infotainment system 182 will display information that is current and make suggestions based on travelers' stored data mining elements. In some embodiments, the Infotainment system 182 and the user device 103 may exchange a unique device ID so that each device recognize each other during the flight. Alternatively, a user device 103 may be connected and/or communicate and be associated with the seat 181 Infotainment system 182 for the length of the trip and/or controlled by cabin management system 183.

In some embodiments, the infotainment system 182 can be controlled by location of a user 100 and/or the aircraft 180 and/or a cabin management system. For example, in some embodiments, the infotainment system 180 can be customized for the user 100 when the user 100 enters an airport or other predetermined area. An airport and/or airline can be configured for smart check-in, which allows a person to by-pass talking with someone at the check-in counter and proceed directly to boarding gate. Seat and boarding information can be automatically sent to a user device 103 when entering the premises and/or may have been sent prior to arrival. In some embodiments, airline seat infotainment system 180 can be configured by scanning the user device 103 at boarding gate as authorization to enter a plane. A form of authorization may be needed to access boarding area as well as customizing travelers' preference/content. For example, in some embodiments, the user may need to present a boarding pass (either paper and/or electronic) to access the boarding area and/or to confirm the user's identity for customization. In some embodiments, the user may be issued a certificate, unique ID, log-in credentials, and/or other electronic identifier that the user is required to enter in order to gain access to a boarding area and/or to access customization options for the infotainment system 182.

Examples of customizing infotainment system 182 preferences/content include showing an advertisement and/or information for a restaurant, coffee shop, and/or other retailer based on stored data mining elements (such as food preferences and/or destination information) suggestion generated by data analysis), providing directions to activities/events that a user enjoys, displaying sightseeing options based on data mining information, and/or providing other contextually appropriate customized information. In some embodiments, shopping, restaurants (food/drinks), and other retailer information is shown for the user's 100 airport terminal (boarding and disembarking) so the user 100 can know in advance where retailers are located. In some embodiments, in-flight and/or pre-flight movie, television, music, food, and/or drink selection suggestions can be shown based on stored travelers' data mining elements. When the user 100 leaves the airplane seat 181, preferences/content change back to default content and are made available for a subsequent user.

In some embodiments, the system 2 is configured to provide an electronic menu (eMenu). The eMenu may be displayed on a user device 103, a menu board located in a retail establishment (such as a menu device either at or behind an order counter or a drive-thru menu board), and/or on any other contextually appropriate device. A user 100 places a user device 103 next to, in proximity of (geo-referencing/location), and/or in contact with a menu and/or retailer, for example, a drive thru, a menu board, and/or a digital display, to establish connection between devices. Examples of customizing an eMenu include showing specific food and/or beverage choices based on stored travelers' data mining elements. When the user 100 leaves the eMenu, preferences/content can change back to default content and made available for the next user.

In some embodiments, a user's customization and/or data mined information 8 can be temporarily stored on one or more third-party devices 104 for a predetermined time period, such as, for example, a length of a trip, and/or stored for future reference, such as, for example, a return trip. In some embodiments, a third-party smart device may require that a unique identifier of the user device 103 be stored either temporarily or permanently for future communication linkage, allowing for faster preference/content customization. Unique identifiers may be stored within the data mined information and/or data elements.

In some embodiments, if multiple user devices with customization and/or data mining information are recognized by one or more third-party devices, the user may be prompted to select which preferences the user 100 wants to use and allows the user to identify default preferences. A selection prompt message can be delivered to the user device 103.

In some embodiments, a user 100 can receive a notification that preferences/content on one or more third-party smart devices 104 have changed. In some embodiments, a user 100 may be prompted (which may or may not require a response from the user 100) when third-party smart devices encounter a smart device belonging to a party other than the user and the third-party owner of the one or more additional smart devices during the user's stay/use of the one or more third-party smart devices.

Figure 8:
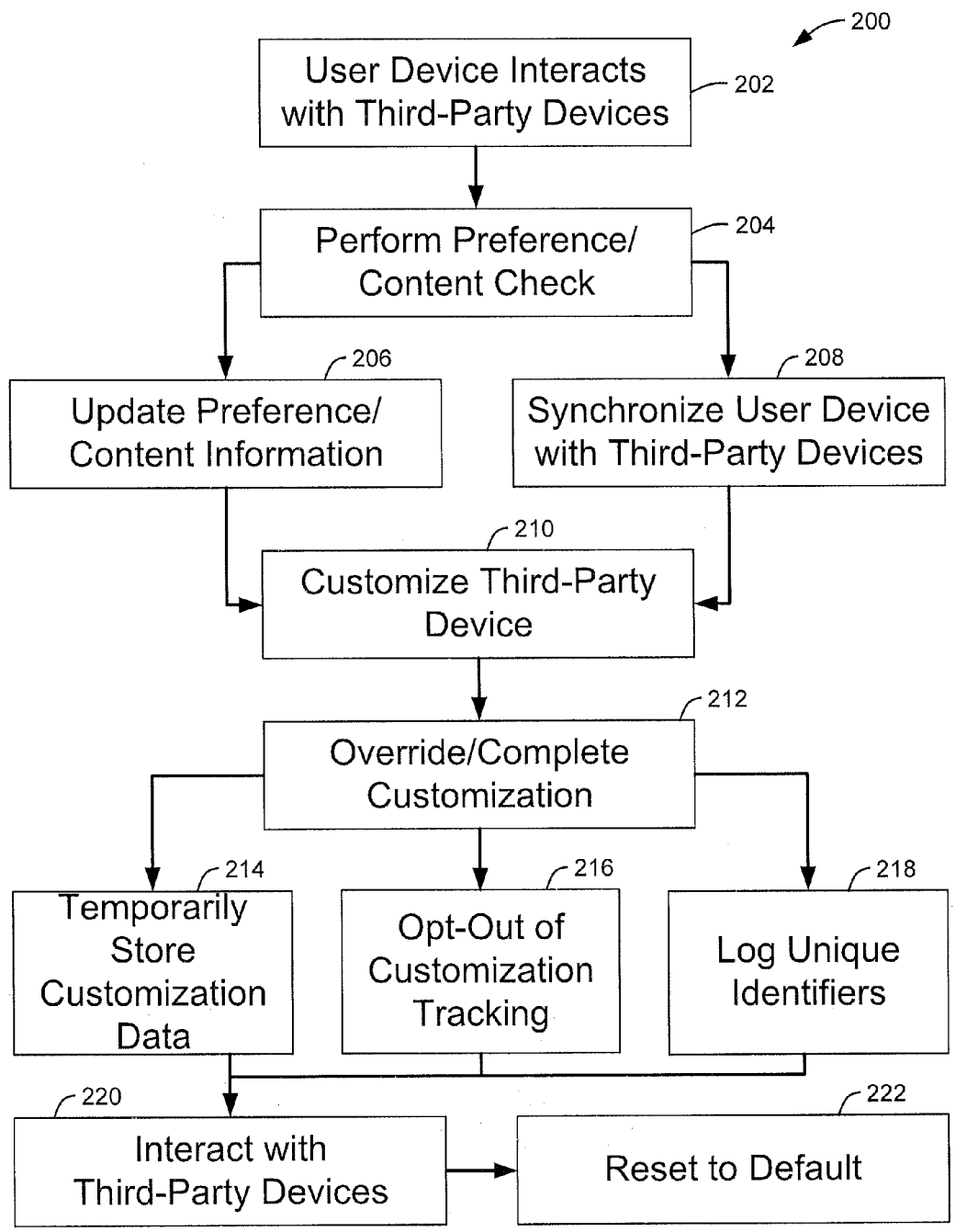
FIG. 8 is a flow diagram, illustrating steps for automating traveler preferences/content of one or more third-party devices in accordance with an embodiment of the present disclosure.

FIG. 8 is one example of a flow diagram 200, illustrating steps for automating traveler preferences/content of one or more third-party devices. In step 202, a user interacts with one or more third-party smart devices. The one or more third-party devices can be located within a predetermined space such as a room, an airplane cabin, a ship cabin, a restaurant, a retailer, and/or any other suitable space. In some embodiments, one or more sensors 10, such as a door sensor, a motion sensor, and/or a device sensor detect when a user and/or a user device have entered the predetermined space. In some embodiments, the one or more third-party devices 104 include a kiosk system 170. A user 100 may initiate customization of the one or more third-party devices 104 by placing a user device 103 in proximity of a third party-device 104, contact between a user device 103 and a third party device 104, and/or by being in a predetermined location corresponding to the predetermined space. For example, in some embodiments, user customization may be initiated when a user 100 enters/exits a hotel or airport lobby. As another example, user customization may be initiated when a user device 103 interacts with a kiosk system 170 and/or a smart check-in system.

In step 204, the one or more third-party devices perform a preference/content check to determine if the user device has previously been used to provide customization information to the third-party devices. If the user device has been previously connected, the one or more third-party devices check for updated customization and/or data mining information for the user in step 206. Additional data mining and/or customization data not previously available may provide one or more additional functions for the third-party smart devices.

If a user device has not previously interacted with a third-party device, in step 208, the user device is synchronized with the one or more third-party devices to provide customization and/or data mining information. Customization data can be generated from data mining information. Customization data and/or data mining information may be stored locally on the user device and/or may be stored remotely, for example, on a user-controlled cloud storage service and/or a third-party controlled cloud storage.

In step 210, the third party device is customized based on the customization information stored on the third-party device (step 206) or generated for the user device (step 208). The customization information includes user specific preferences and/or content for the one or more third party devices. In some embodiments, customization information is combined with default and/or general user preferences to generate customization information for specific third-party devices.

In step 212, a user 100 may override and/or fill-in automatically generated preferences for the third party devices. For example, a user 100 may override customization information if the user prefers a different experience during travel. As another example, a user may activate and customize third-party devices 104 where customization information is not available. In step 214, user data customization and/or data mining information is updated based on user provided and/or new data mining information. In step 216, a user 100 may optionally opt-out of keeping track of data mining preferences, content, and/or may disable customization entirely. In step 218, customization data 8 may be temporarily stored on the one or more third-party devices 104 to allow for future customization during a current interaction/trip and/or during future interactions/trip. In step 220, unique identifiers for any non-user smart device that interacts with the third-party devices may be temporarily and/or permanently stored, for example, in local memory 6d associated with a third-party device 104, in a remote storage location 6b, 6c, on a local hub 140, and/or in any other suitable storage location.

In step 222, the user interacts with one or more third-party devices that are customized for the user preferences/content.

The user may directly and/or indirectly interact with the one or more third party devices 104. For example, in some embodiments, the user may directly interact with the third-party devices 104, such as using a microwave 104*b* to heat food or a coffee maker 104*c* to brew coffee. In some embodiments, the user may indirectly interact with the third-party devices 104 through a user device, for example, changing a temperature setting of a thermostat 104*e* or currently displayed content of a television 104*d* through the user device. The user is provided with a fulfilling interaction/travel experience based on the customized interactions. In step 222, the third party devices may revert to a default/ready state when a user leaves a predetermined area/proximity to the third-party devices.

Figure 9:
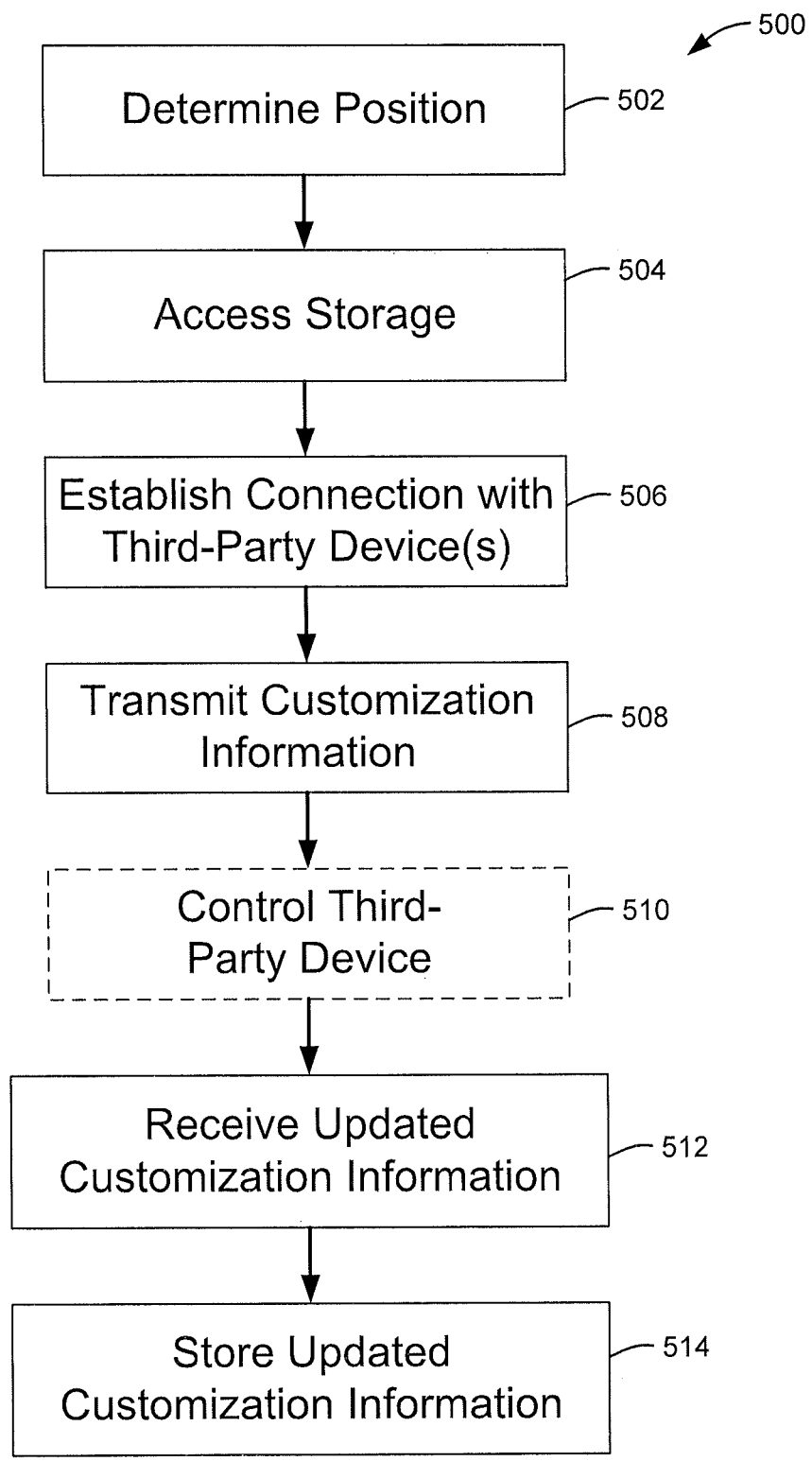
FIG. 9 is a flow diagram, illustrating steps of an embodiment of the present disclosure for a user device providing customization information to a third-party device.

FIG. 9 is one example of a flow diagram 500, illustrating steps for a user device 103 providing customization information 8 to a third-party device 104. In step 502, a user device 103 determines its position with respect to one or more third-party devices 104. For example, in some embodiments, the user device 103 determines location based on one or more location services, such as GPS, Wi-Fi location, and/or using one or more input/output subsystems 304. In some embodiments, the user device 103 position relative to one or more third party devices 104 is provided to the user device 103 by the one or more third party devices 104. For example, a third-party device 104 may transmit a signal to the user device 103 when the third-party device 104 determines the user device 103 is in proximity to the third-party device 104.

In step 504, the user device 103 accesses storage 6 to retrieve user customization information/data mined information 8. The user customization information 8 can be retrieved from a local storage 6*a* on the user device or a remote storage 6*b*, 6*c* accessed through one or more networks, such as, for example, a cellular network and/or a WiFi network. In some embodiments, the user device 103 generates customization information from data mined elements in the storage 6. In step 506, the user device 103 establishes a connection with one or more third-party devices 104. The user device 103 can establish a connection with the one or more third-party devices 104 over any suitable communication medium, such as, for example, a Wi-Fi network, a cellular network, a Bluetooth connection, a NFC connection, a wired connection, and/or any other suitable connection. In some embodiments, the user device 103 initiates the connection with the third-party devices 104 by transmitting a token, handshake, or other identifying message to the third-party devices 104. In other embodiments, the third-party devices 104 initiate the connection with the user device 103.

In step 508, the user device 103 transmits the customization information 8 to the one or more third-party devices 104. The user device may transmit the customization information 8 to the one or more third-party devices 104 over the previously established connection. In some embodiments, the user device 103 may provide information to the third-party devices 104 to allow the third-party devices 104 to retrieve the customization information 8 from a remote storage device 6*b*, 6*c*. In some embodiments, the user device 103 may confirm receipt of the customization information, for example, by requesting a confirmation message from the one or more third-party devices.

In step 510, the user device 103 may be optionally used to controlled the third-party devices 104. For example, in some embodiments, the user device 103 may be configured as a remote control to control one or more functions of one or more third-party devices, such as a television 104*d*. In some embodiments, the user may indirectly interact with the third-party devices 104 through the user device 103, for example, by changing one or more preferences and/or customization options (e.g., customization information) stored on the phone. For example, the user may update a temperature preference on the user device 103, causing the user device 103 to transmit the new preference to a thermostat 104*e* to change the settings of the thermostat 104*e*.

In step 512, the user device receives updated customization information from the one or more third-party devices 104. The updated customization information can be generated by the one or more third-party devices 104 in response to direct user interactions with the third-party devices 104. For example, in some embodiments, if a user manually changes one or more settings of the third-party device 104, the changed settings are transmitted to the user device 103 as updated customization information. The user device 103 can store the updated customization information for future use. In step 514, the user device 103 stores the updated customization information on remote storage devices 6*b*, 6*c*.

Figure 10:
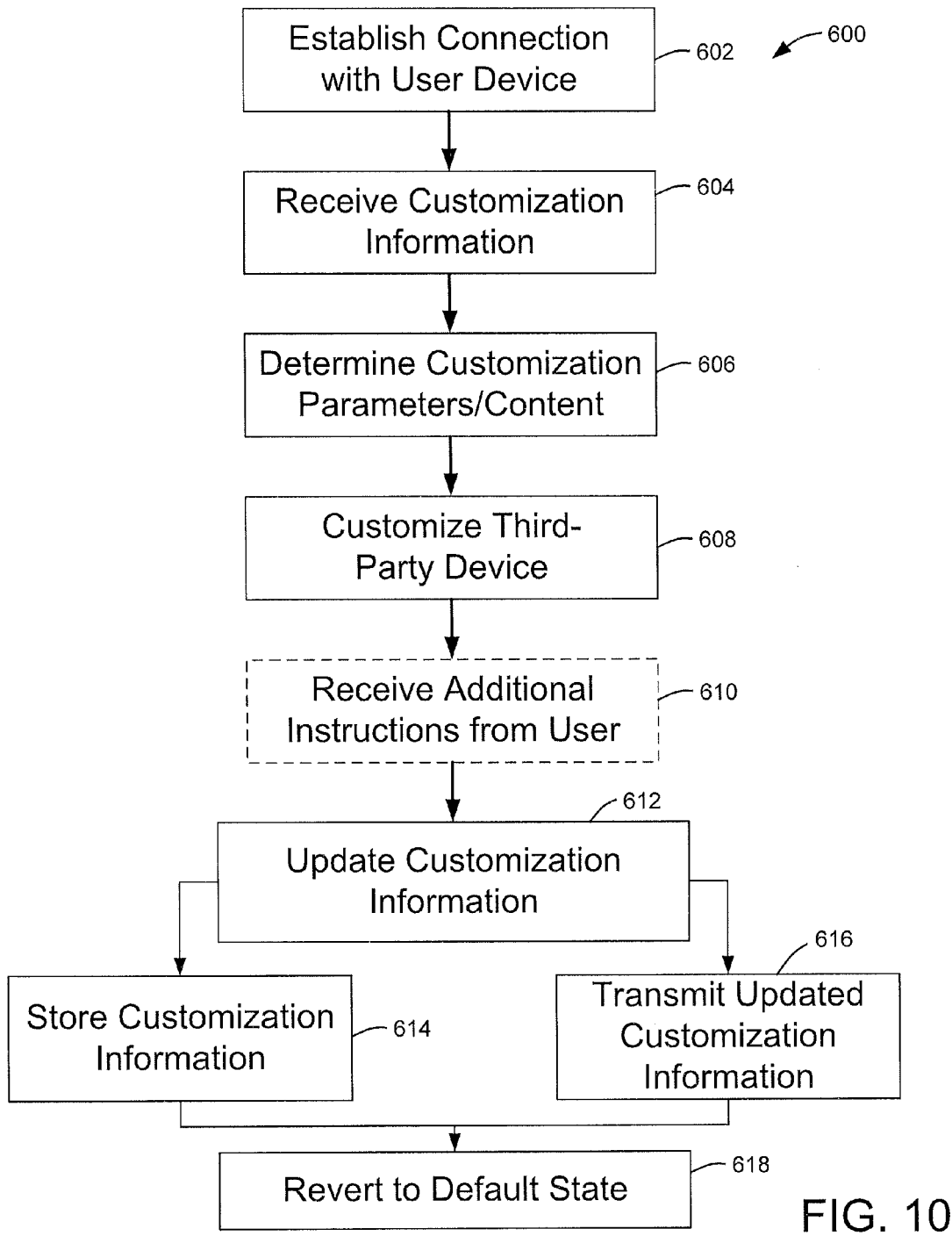
FIG. 10 is a flow diagram, illustrating steps for customizing a third-party device.

FIG. 10 is one example of a flow diagram 600, illustrating steps for customizing a third-party device 104. In step 602, a connection is established between the third-party device 104 and a user device 103. The third-party device 104 can establish a connection with the user device 103 over any suitable communication medium, such as, for example, a Wi-Fi network, a cellular network, a Bluetooth connection, a NFC connection, a wired connection, and/or any other suitable connection. In some embodiments, the third-party device 104 initiates the connection with the user device 103 by transmitting a token, handshake, or other identifying message to the user device 103 when the user device is determined to be within a predetermined proximity of the third-party device 104. The third-party device 104 may detect the proximity of the user device 103 through one or more sensors 10. In other embodiments, the user device 103 initiate the connection with the third-party device 104.

In step 604, the third-party device 104 receives customization information 8 from the user device 103. The customization information 8 can be transmitted over the previously established connection. In some embodiments, the user device 103 may provide information to the third-party device 104 to allow the third-party device 104 to retrieve the customization information 8 from a remote storage device 6*b*, 6*c*. In some embodiments, the third-party device 104 may confirm receipt of the customization information, for example, by transmitting a confirmation message to the user device 103.

In step 606, the third-party device 104 determines customization parameters and/or content selections from the received customization information 8. The third-party device 104 may determine customization parameters by, for example, identifying elements in the customization information 8 corresponding to programmable elements of the third-party device 104. For example, in one embodiment, a thermostat 104*e* may receive customization information 8 including temperature preferences for a user. The thermostat 104*e* extracts the temperature preferences from the customization information 8. In step 608, the third-party device 104 uses the customization information to customize one or more settings and/or parameters of the third-party device 104. For example, to continue the previous thermostat example, the thermostat 104*e* programs the temperature setting for a space using the temperature preference extracted from the customization information 8.

In step 610, the third-party device 104 can receive additional instructions from the user, either directly or indirectly.

For example, in some embodiments, the user interacts directly with the third-party device 104 to change one or more settings, such as adjusting the temperature of the thermostat 104e. As another example, in some embodiments, the user interacts indirectly with the third party device 104, for example, by updating preferences on a user device 103 which are provided to the third-party device 104 over the established connection. In step 612, the third-party device 104 updates the user customization information received from the user device 103. The third-party device 104 may update the user customization information based on, for example, direct or indirect interactions with the user, newly mined data, and/or additional data points received from the user and/or a third-party.

In step 614, user customization information may be stored in local storage 6d on the third-party device 104. The customization information may be stored temporarily and/or permanently. For example, in some embodiments, the customization information may be stored locally to allow the third-party device 104 to quickly re-program based on user preferences. As another example, customization information may be stored by the third-party device 104 for a period of time equal to a rental period for the third-party device 104 (or a space containing the third-party device 104). In some embodiments, a user may opt-out of having customization information stored on a third-party device 104. In step 616, the updated customization information is transmitted to the user device 103 and/or the remote storage device(s) 6b, 6c.

In step 618, the third-party device 104 reverts to a default state, such as, for example, an un-programmed or factory-programmed state. The third-party device 104 may revert to the default state when the user device 103 leaves a predetermined area (e.g., gets a predetermined distance away from the third-party device 104). In some embodiments, the third-party device 104 reverts to the default state after a predetermined period of time.

Although the steps of FIGS. 8-10 are shown sequentially, those skilled in the art will recognize that the steps may be performed in any order. Additional steps may be added and/or steps omitted from the flow diagrams shown in FIGS. 8-10 and are within the scope of this disclosure.

The above examples should not be construed as being limited but rather to convey the scope of the invention.

It is understood that that the above described arrangements are only illustrative of the application of the principles of the present invention. Numerous modification and alternative arrangements may be devised by those skilled in the art without departing from the spirit and scope of the present invention. Thus, while the present invention has been described above with particularity and detail in connection with what is presently deem to be the most practical and preferred embodiment(s) of the invention, it will be apparent to those of ordinary skill in the art that numerous modifications, including, but not limited to, variations in size, materials, shape, form, function, manner of operation, assembly, and use may be made without departing from the principles and concepts of the inventions.

It is understood that when an embodiment is referred hereinabove as being "placed on" another element, it can be directly on the other element or intervening elements may be present there between.

It is understood that when an internet of things/smart devices/appliances devices or smart phone is referred hereinabove as being "turned on" that electrical power may be which may require device to be plugged into electrical system or that the device needs to the "power on switch" activated.

It is understood that when an embodiment is referred to hereinabove as a "personal electronic device" that it could be referencing a smart phone, smart tablet, smart watch, smart card or any other personal smart devices.

It is understood that some embodiment(s) may require authorization or some form of security clearance before accessing certain areas.

It is understood that when an embodiment is referred to hereinabove as a "traveler" that it could be referencing a person who moves from place to place instead of staying in one location for a long period of time. Alternatively, a "traveler" could be a person who is moving about and not at their original known resident. Example is going from point "A" to point "B". Point A would be considered as home (known resident) and Point B is where the person is traveling to and may be final destination temporarily. Until person, returns back to Point A, they are considered as a traveler.

It is understood that when an embodiment is referred to hereinabove as a "traveler" or "consumer" or "end-user" that the reference is talking about the same person(s).

It is understood that when an embodiment is referenced to be connected to, or connectivity, that it could refer to one or more devices being connected and communicating, or it could refer to a direct data communication connection.

It is further understood that appropriate software and algorithms, housed or hosted on remote servers are used for performing the various functions described here.

Spatially relative terms, such as "beneath," "below," "lower," "above," "upper," "next to" and the like, are used herein for ease of description to describe one element or feature's relationship to another element(s) or feature(s) as illustrated in the figures. It is understood that the spatially relative terms are intended to encompass different orientations of the devices in use or operations in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with references to cross section illustrations that are schematic illustrations of idealized embodiments. As such, variations from the shapes of the illustrations as a result, for example of manufacturing techniques and/or tolerances, are to be expected. Thus examples embodiments described herein should not be construed as limited to the particular shapes of regions as illustrated herein, but are to include deviations in shape or size that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes and/or sizes are not intended to illustrate the precise shape and/or size of a region and are not intended to limit the scope of the present claims.

In conclusion, herein is presented a system for automatically changing and/or configuring preferences/content for an internet of thing/smart device owned by someone else other than the traveler by referencing a consumer/end-user/travelers' personal electronic device(s) based on stored data mining elements. The disclosure is illustrated by examples throughout the written description and drawings. It should be understood that numerous variations are possible, while adhering to the inventive concept. Such variations are contemplated as being a part of the present disclosure

What is claimed is:

1. An automatically smart device customization method for customizing information on one or more third-party smart devices/internet of thing device based on a user customization data, and wherein the user customization data is displayed on a third-party smart device, and wherein the third-party device is configured to receive the user customization data from at least one data storage option, and wherein the personalization of the third-party smart device provides a fulfilling user experience, comprising:
   associating, at least one user with at least one user device and at least one third-party smart device in proximately to each other within a space temporarily occupied by the user;
   monitoring, by a network monitoring device which is configured to control configuration of at least one third-party smart device;
   establishing, by a network monitoring device, communication between a user device and a third-party smart device;
   comparing, the default content on at least one third-party smart device to user customization data;
   receiving, one or more user customization data from at least one storage device options comprising of at least a user controlled storage device, cloud storage device, third-party storage device, and offline storage device;
   generating, by the processor, one or more customization instructions from the one or more data mined elements;
   controlling, at least one user customization data element by at least one data mining technique, and wherein said data mining technique is further associated with at least one subset technique;
   customizing, by the processor, one or more elements of a third-party smart device in response to the customization instructions;
   displaying and/or outputting, at least the customized content to the user on the third-party smart device with the user customization data;
   fulfilling, the user experience by a seamless integration between user customization data and third-party smart device; and
   wherein when the user leaves the proximity area of the third-party smart device, the third-party smart device is configured to change back to the default content setting and the third-party smart device is further capable of storing at least one new user customization data back to a storage device for future use.

2. The automatically smart device customization method of claim 1, wherein the third-party smart device comprises a third-party smart device under the control of someone other than the user.

3. The automatically smart device customization method of claim 2, wherein the third-party smart device can be operated autonomously.

4. The automatically smart device customization method of claim 1, wherein the one or more customization instructions are transmitted by a user personal device.

5. The automatically smart device customization method of claim 1, wherein the third-party device is enabled for customization by a user using at least a visual input/output component of said third-party smart device.

6. The automatically smart device customization method of 5, wherein connectivity is established by proximity between the user and the third-party smart device.

7. The automatically smart device customization method of claim 1, wherein the processor receives the one or more data mined elements from a storage device.

8. The automatically smart device customization method of claim 1, wherein the processor receives the one or more data mined elements from a remote storage device.

9. The automatically smart device customization method of claim 1, wherein customizing the one or more elements of the third-party smart device includes configuring a setting or content selection of the third-party smart device.

10. The automatically smart device customization method of claim 9, comprising reverting, by the third-party smart device, to a default configuration once said user leaves the space temporarily occupied.

11. The automatically smart device customization method of claim 1, wherein the one or more data mined elements are established by data mining techniques including at least one of the predictive modeling, database segmentation, link analysis, deviation detection, or any other suitable data mining operation.

12. An automatically smart device customization system for customizing information on one or more third-party smart devices/internet of thing device based on a user customization data, and wherein the user customization data is displayed on a third-party smart device, and wherein the third-party device is configured to receive the user customization data from at least one data storage option, and wherein the personalization of the third-party smart device provides a fulfilling user experience, comprising of:
   at least one third-party smart device located within a temporary space use location which is accessible by a user having at least one user device, and wherein the at least one third-party smart device including one or more programmable elements, and wherein the third-party smart device is network monitored for controlling configuration, and wherein at least one user customization data element is controlled and generated by at least one data mining technique, and wherein the at least one third-party smart device is configured to receive one or more customization instructions from a user device, and wherein at least one user customization data is retrieved from at least one storage device, and wherein the at least one third-party smart device configures the one or more programmable elements in response to the customization instructions, and wherein the user customization data is displayed or outputted on the third-party smart device to the user, which thereby provides a fulfilled and seamless user experience.

13. The automatically smart device customization system of claim 12, wherein the customization instructions comprise one or more data mined elements corresponding to a user.

14. The automatically smart device customization system of claim 12, wherein the one or more data mined elements are established by data mining techniques including at least one of predictive modeling, database segmentation, link analysis, or deviation detection.

15. The automatically smart device customization system of claim 12, wherein the at least one third-party smart device can be operated autonomously.

16. The automatically smart device customization system of claim 12, wherein the at least one third-party smart device receives the one or more customization instructions from a storage device of local to the user device.

17. The automatically smart device customization system of claim 12, wherein the at least one third-party smart device receives the one or more customization instructions from a storage device remotely located from the user device.

18. The automatically smart device customization system of claim 12, wherein configuring the one or more programmable elements of at least one third-party smart device includes configuring a setting or content selection of the at least one third-party smart device.

19. The automatically smart device customization system method of claim 18, wherein the at least one third-party smart device reverts to a default configuration after a predetermined time period.

20. An automatically smart device customization method for customizing/personalizing content information on a third-party smart device/internet of thing device, comprising:
  monitoring, by a networked monitoring device which is configured to control configuration of at least one third-party smart device;
  establishing a connection between a user personal device and a third-party smart device;
  detecting, at least a pattern in the data mined element from at least one data mining technique;
  receiving, at a third-party smart device, one or more data mined elements from the user device;
  determining, by a processor of the smart device, one or more user preferences based on the one or more data mined elements;
  adjusting, at least one setting smart device with the one or more user preference; preferences;
  displaying and/or outputting at least the customized content to the user on the third-party smart device with the user preference;
  fulfilling, the user experience by a seamless integration between user customization data and third-party smart device; and
  wherein when the user leaves the proximity area of the third-party smart device, the third-party smart device is configured to change back to the default content setting and the third-party smart device is further capable of storing at least one new user customization data back to a storage device for future use.

\* \* \* \* \*